(12) United States Patent
Smith

(10) Patent No.: US 10,048,562 B2
(45) Date of Patent: Aug. 14, 2018

(54) ELECTROPHORETIC FLUID

(71) Applicant: Merck Patent GmbH, Darmstadt (DE)

(72) Inventor: Nathan Smith, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 577 days.

(21) Appl. No.: 14/408,031

(22) PCT Filed: Jun. 13, 2013

(86) PCT No.: PCT/EP2013/001749
§ 371 (c)(1),
(2) Date: Dec. 15, 2014

(87) PCT Pub. No.: WO2013/189580
PCT Pub. Date: Dec. 27, 2013

(65) Prior Publication Data
US 2015/0177587 A1   Jun. 25, 2015

(30) Foreign Application Priority Data
Jun. 22, 2012   (EP) .................................. 12004715

(51) Int. Cl.
*C09K 9/00* (2006.01)
*G02F 1/167* (2006.01)

(52) U.S. Cl.
CPC ...... *G02F 1/167* (2013.01); *G02F 2001/1678* (2013.01)

(58) Field of Classification Search
USPC .......................... 252/583; 106/493, 499, 502
See application file for complete search history.

(56) References Cited

U.S. PATENT DOCUMENTS

| | | | |
|---|---|---|---|
| 5,380,362 A * | 1/1995 | Schubert | G02F 1/167 106/493 |
| 5,403,518 A | 4/1995 | Schubert | |
| 5,783,614 A | 7/1998 | Chen et al. | |
| 6,194,488 B1 | 2/2001 | Chen et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 2006/0025499 A1 | 2/2006 | Van Brocklin et al. | |
| 2007/0268244 A1 | 11/2007 | Chopra et al. | |
| 2009/0290208 A1 | 11/2009 | Murata et al. | |
| 2010/0053728 A1 | 3/2010 | Lin et al. | |
| 2011/0255145 A1 | 10/2011 | Masuzawa et al. | |
| 2012/0134010 A1 | 5/2012 | Sprague et al. | |

FOREIGN PATENT DOCUMENTS

| | | |
|---|---|---|
| CN | 101080665 | 6/2010 |
| CN | 101870827 | 10/2010 |
| CN | 102272672 | 12/2011 |
| CN | 102486592 | 6/2012 |
| EP | 1491941 A2 * | 2/2004 |
| EP | 1491941 A2 | 12/2004 |
| GB | 2438436 A | 11/2007 |
| JP | 2010164659 A | 7/2010 |
| WO | WO-99/10767 A1 | 3/1999 |
| WO | WO-2004034139 A1 | 4/2004 |
| WO | WO-2005017046 A2 | 2/2005 |
| WO | WO-20070128352 A1 | 11/2007 |
| WO | WO-2009100803 A2 | 8/2009 |
| WO | WO-2010089057 A2 | 8/2010 |
| WO | WO-2010089058 A1 | 8/2010 |
| WO | WO-2010089059 A1 | 8/2010 |
| WO | WO-2010089060 A2 | 8/2010 |
| WO | WO-2011154103 A1 | 12/2011 |
| WO | WO-2011154104 A1 | 12/2011 |
| WO | WO-2012019704 A1 | 2/2012 |
| WO | WO-2013026519 A1 | 2/2013 |
| WO | WO-2013079146 A1 | 6/2013 |

OTHER PUBLICATIONS

International Search Report for PCT/EP2013/001749 dated Sep. 2, 2013.

\* cited by examiner

*Primary Examiner* — Monique Peets

(57) ABSTRACT

This invention relates to electrophoretic fluid comprising solvents, a highly absorbing dye, and charged particles of different color, and electrophoretic display devices comprising such fluids.

12 Claims, 2 Drawing Sheets

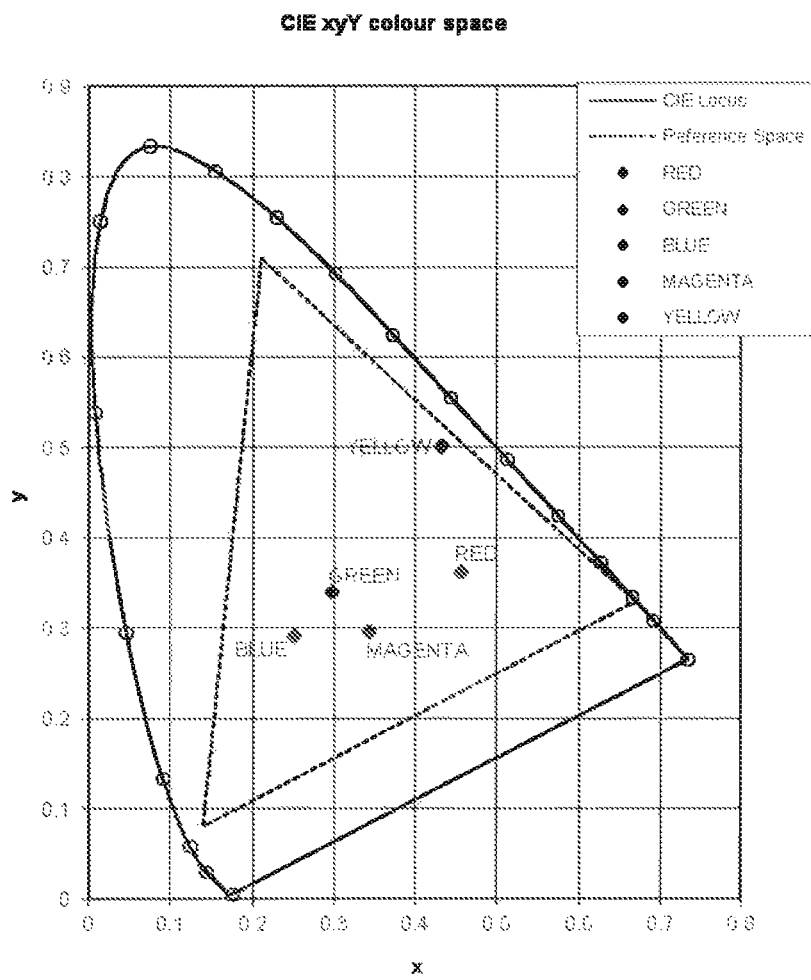
Figure 1: Colour data for Examples 9-13

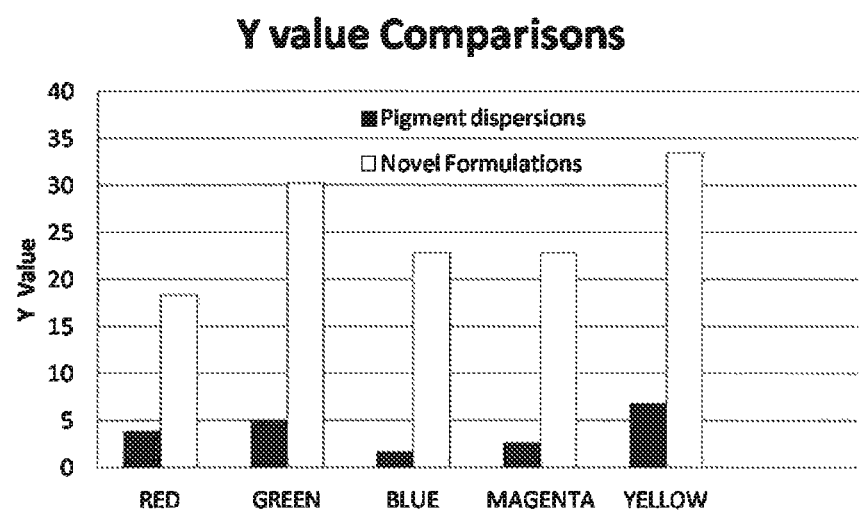
Figure 2: Y value comparison for Examples 9-13

ELECTROPHORETIC FLUID

CROSS-REFERENCE TO RELATED APPLICATIONS

This application is a national stage application (under 35 U.S.C. § 371) of PCT/EP2013/001749, filed Jun. 13, 2013, which claims benefit of European Application No. 12004715.4, filed Jun. 22, 2012, both of which are incorporated herein by reference in their entirety.

This invention relates to electrophoretic fluid comprising solvents, a highly absorbing dye, and charged particles of different colour, and electrophoretic display devices comprising such fluids.

BACKGROUND OF THE INVENTION

Particles suitable for use in electrophoretic displays (EPD), e.g. coloured electronic paper have been exemplified in recent patent literature; e.g. (U.S. Pat. No. 7,304,634, GB 2 438 436, US 2007/0268244). It is now possible to control and manipulate features such as size, colour, charge and polydispersity independently to produce particles with desired properties for EPD; e.g. WO 2010089057. A number of different techniques can be used to create an optical effect by the movement of particles. One such method could incorporate the use of reflective colour particles, and absorbing black particles to generate a pixel that can be switched between a colour, and a black optical state.

The biggest challenge of such a system is obtaining a highly reflective colour state. Typical colour pigments that can be dispersed in solvents used for EPD do not show a high enough reflectivity to generate an appropriate optical difference. In addition, colour tuning of pigments is restrictive and the choice of colours is limited. High resolution Printing and dispensing of such pigment dispersions is also very challenging. So, there continues to be a demand for improved electrophoretic fluids.

BRIEF SUMMARY OF THE INVENTION

The present invention relates to electrophoretic fluids comprising at least one solvent, at least two kinds of particles having different colour and opposite electrical charge, and at least one highly absorbing dye.

Furthermore, the invention relates to electrophoretic displays comprising such fluids.

The present invention provides improved electrophoretic fluids by incorporating a highly absorbing dye into a dual particle electrophoretic fluid, preferably into a dual particle Black/White EPD fluid.

DETAILED DESCRIPTION OF THE INVENTION

By incorporating a highly absorbing dyed solvent in the interstices between the particles, increased colour saturation and reflectivity can be achieved. By applying a suitable driving scheme, increased colour saturation can also be achieved. Particle spacing can be either increased to give a black-yellow pixel with simple driving scheme, or reduced to give a Black-Yellow-White pixel, with a more complex driving scheme. By using dyes, chromophore adjustment can give an increased choice of colour and colour tuning for specific applications, e.g. a company logo, or colour gamut adjustment can be achieved.

By ensuring sufficient spacing between the white particles, a strongly coloured and highly reflective colour state can be achieved. In addition, by careful driving of the display, further increased colour saturation and grayscales can be achieved. Alternatively, by reducing the spacing between particles, a three-colour pixel could be achieved, whereby the display appears white when the white particles are compressed at the top of the electrode, black when the black particles are at the top electrode, or highly coloured when the particles are in transit.

Electrophoretic fluids of the invention comprise dyes and dye mixtures with high absorbance and preferably with increased solubility in non-polar solvents. Preferably, the dyes have an absorbance of at least 0.3 a.u., preferably of at least 0.5 a.u., especially of at least 0.7 a.u., in a cell thickness of 50 microns, Preferably, the absorbance is measured for a saturated solution of dyes in dodecane. Most advantageously used are dyes with an absorbance as high as possible. The absorbance data can be derived using the Lambert-Beer law $A=-\lg(I/I_0)=\in cd$, where A is the absorbance at a certain wavelength, I is the intensity of the transmitted radiation, $I_0$ is the intensity of the radiation before transmission, $\in$ is the molar extinction coefficient (l/mol cm), c is the concentration (mol/l), and d is the path length (cm). The absorbance is unitless. However, the absorbance is often reported in "arbitrary units" (a.u.) or in "Absorbance Units" (AU). Arbitrary units (a.u.) are used throughout the present invention. The absorbance of the dyes can preferably be measured using a Hitachi U3310 UV-vis spectrophotometer and a saturated solution of dyes in dodecane.

The required solubility depends upon the extinction coefficient of the dye, but usually should be over 1% by weight and preferably >5% by weight. Dye solubilities of >20% by weight have been observed and can preferably be utilized in this method to give maximum colour saturation.

The function of the dye is to colour the electrophoretic fluid. The dye consists of a chromophore, optional linker groups (spacers), and optional groups to modify physical properties (like solubility, light fastness, etc.) and optionally charged group(s). Careful design of the dye structure and using a mixture of homologues can result in increased solubility.

The chromophoric group preferably comprises of conjugated aromatic (including heteroaromatic) and/or multiple bonds including: azo (including monoazo, disazo, trisazo linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups. Preferred chromophoric groups are azo groups (especially monoazo, and disazo) and anthraquinone groups.

A dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, di- and tris azo compounds can be used to obtain blacks and other duller shades (navy blue, brown, olive green, etc).

Mixtures of dyes can also be used to obtain the correct electrophoretic fluid shade. Similarly shades can be tuned by for example by adding small quantities of separate dyes to modify the colour of the electrophoretic fluid (e.g. 95% yellow and 5% cyan to get a greener yellow shade).

A particular focus is the use of mixtures of one chromophore. The solubilising groups on the chromophore are preferably hydrocarbon chains consisting of 4 or more carbons. These chains can be straight chain, branched chain, contain isomers such diastereoisomers, be optionally substituted with O, S, N, F. Preferably a mixture of homologues comprising hydrocarbon chains consisting of 8-20 carbons is used to give highest solubility. One advantage is that a mixture of homologues can be prepared in a one pot procedure, reducing cost of preparing individual dyes.

Dyes having improved solubility, preferably in non-polar solvents and hence higher absorbance of the resultant solution can preferably be used. By using a multi-component dye concept the solubility can be further increased to enable a highly absorbing material suitable for use in EPD. By mixing dyes of identical chromophore, but with altered surrounding structure, the overall solubility of the dye chromophore is increased, and higher absorbance values can be achieved. By adding dyes with similar chromophore/ altered surrounding structure, a multi-component dye system results in enhanced solubility and absorbance. One advantage is that a mixture of homologues can be prepared in a one pot procedure, reducing cost of preparing individual dyes.

Advantageously, dye mixtures utilising the same chromophore but with variation of the solubilising groups are used. This gives hugely improved solubility. Surprisingly, when a mixture of the same chromophore but with different long hydrocarbon groups to increase solubility is used, solubility of up to 15% is achieved. Especially, combinations of dyes are used to achieve electrophoretic fluids with strong colour intensity.

Preferably, the electrophoretic fluid of the invention comprises at least one dye according to Formula I, Formula II, Formula III, Formula IV or Formula V

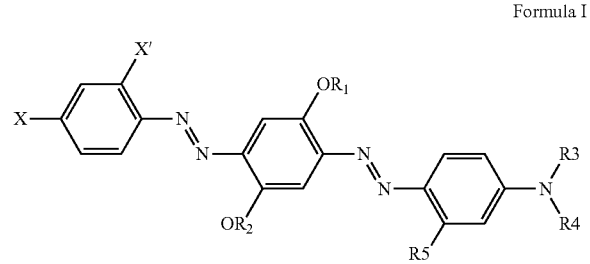

Formula I wherein

X and X' are independently of one another H or an electron-withdrawing group;

$R_1$ and $R_2$ are independently of one another groups are linear or branched, substituted or unsubstituted alkyl groups where one or more non-adjacent carbon atoms may be replaced by O, S and/or N, preferably C8-C20;

$R_3$ and $R_4$ are independently of one another groups are linear or branched, substituted or unsubstituted alkyl groups where one or more non-adjacent carbon atoms may be replaced by O, S and/or N, preferably C8-C20;

R5 is a methyl or methoxy group;

and the dye comprises at least one electron-withdrawing group;

Formula II wherein $R_6$ and $R_7$ are independently of one another groups are linear or branched, substituted or unsubstituted alkyl groups where one or more non-adjacent carbon atoms may be replaced by O, S and/or N, preferably C8-C20;

Formula III wherein

X" is an electron-withdrawing group;

$R_8$ is a methyl or methoxy group;

$R_9$ and $R_{10}$ are independently of one another groups are linear or branched, substituted or unsubstituted alkyl groups where one or more non-adjacent carbon atoms may be replaced by O, S and/or N; preferably C8-C20;

Formula IV wherein $R_{12}$ and $R_{13}$ are independently of one another groups are linear or branched, substituted or unsubstituted alkyl groups where one or more non-adjacent carbon atoms may be replaced by O, S and/or N; preferably C8-C20;

$R_{11}$ is an alkyl or alkoxy group with at least 3 carbon atoms;

Formula V wherein $R_{14}$ and $R_{15}$ are independently of one another groups are linear or branched, substituted or unsubstituted alkyl groups where one or more non-adjacent carbon atoms may be replaced by O, S and/or N; preferably C8-C20;

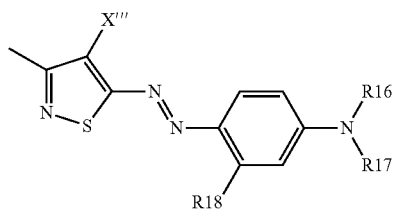

Formula VI wherein

X''' is an electron-withdrawing group;

$R_{16}$ and $R_{17}$ are independently of one another groups are linear or branched, substituted or unsubstituted alkyl groups where one or more non-adjacent carbon atoms may be replaced by O, S and/or N, preferably C8-C20.

$R_{18}$ is NHCOR with R=linear or branched C1-C10 alkyl groups, preferably NHCOCH$_3$.

The term "electron-withdrawing group" is well known in the art and refers to the tendency of a substituent to attract valence electrons from neighbouring atoms; in other words the substituent is electronegative with respect to neighbouring atoms. Examples of electron-withdrawing groups include $NO_2$, CN, halogen, acyl, trifluoromethoxy, trifluoromethyl, $SO_2F$, and $CO_2R$, $SO_2R$, $SO_2NRR$ or $SO_2NHR$, with R being independently linear or branched alkyl, preferably C1-C4 alkyl. Preferred electron-withdrawing groups are $NO_2$, CN, Br, Cl, $SO_2NRR$ or $SO_2NHR$.

Preferably, dyes of Formula I with linear or branched C8-C20 alkyl groups are used, especially those with additional $NO_2$ and/or CN groups.

Also preferred are dyes of Formula II with linear or branched C8-C20 alkyl groups are used, especially those with additional $NO_2$ and/or CN groups.

It is most advantageous to use mixtures of homologue dyes comprising dyes with different linear or branched alkyl groups, preferably with C8-C20 groups; for example mixtures of dyes with 2-ethylhexyl, n-octyl, 3,5,5-trimethylhexyl, n-decyl, n-undecyl, n-dodecyl, tetradecyl, and/or pentadecyl groups.

Also preferred are dyes of Formulae II, III, V, and VI.

Especially the dyes listed in the following tables may be used.

TABLE 1

| | Cyan Dyes | | |
|---|---|---|---|
| Dye No. | Structure | Compound Data | Saturation wt % in decane |
| Dye 1 | [structure: azo dye with $O_2N$, CN, CN substituents on one ring, linked via N=N to ring with O-methyl, $N(C_{18}H_{37})_2$, and HN-acetyl] | UV-vis $\lambda_{max}$ 642 nm, $\varepsilon_{max}$ 103,000 HBW 44 nm (hexane) $\lambda_{max}$ 595 nm, $\varepsilon_{max}$ 48,500 HBW 77 nm (hexane) Mp: 95-97° C. | 0.003 |
| Dye 2 | [structure: 1,4-diaminoanthraquinone with HN-R groups] R = n-octyl/2-ethylhexyl/undecyl/dodecyl | UV-vis $\lambda_{max}$ 645 nm, $\varepsilon_{max}$ 15,000 (hexane) $\lambda_{max}$ 596 nm, $\varepsilon_{max}$ 13,250 (hexane) Mp: amorphous solid | 4.2 |
| Dye 3 | [structure: 1,4-diaminoanthraquinone with HN-R groups] R = 2-ethylhexyl/dodecyl/tetradecyl/pentadecyl | UV-vis $\lambda_{max}$ 645 nm, $\varepsilon_{max}$ 15,750 (hexane) $\lambda_{max}$ 596 nm, $\varepsilon_{max}$ 14,000 (hexane) Mp: amorphous solid | 4.557 |

TABLE 2

Magenta Dyes

| Dye No. | Structure | Compound Data | Saturation wt % in decane |
|---|---|---|---|
| Dye 4 | 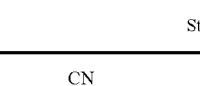 | UV-vis<br>$\lambda_{max}$ 536 nm,<br>$\varepsilon_{max}$ 61,750<br>HBW 71 nm (hexane)<br>$\lambda_{max}$ 548 nm,<br>$\varepsilon_{max}$ 61,000<br>HBW 77 nm (EtOAc)<br>Mp: 110-111° C. | 0.19 |

TABLE 3

Yellow Dyes

| Dye No. | Structure | Compound Data | Saturation wt % in decane |
|---|---|---|---|
| Dye 5 | 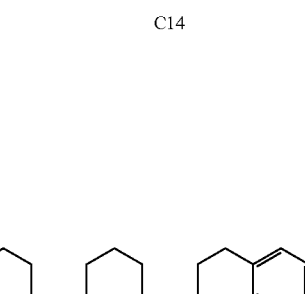 | UV-vis<br>$\lambda_{max}$ 436 nm,<br>$\varepsilon_{max}$ 45,000<br>HBW 73 nm (hexane)<br>HPLC (420 nm): >99.5%<br>Mp: 73-75° C. | 1.03 |
| Dye 6 | 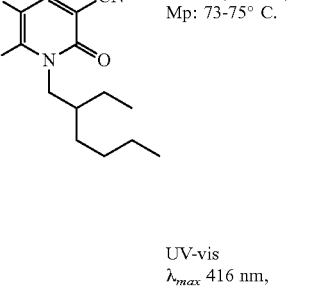 | UV-vis<br>$\lambda_{max}$ 416 nm,<br>$\varepsilon_{max}$ 38,000<br>HBW 67 nm (hexane)<br>Mp: 63-65° C. | 3.72 |
| Dye 7 | 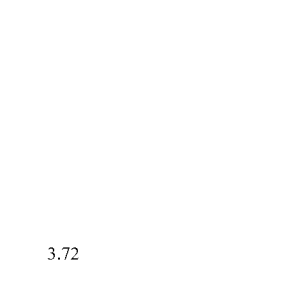 | UV-vis<br>$\lambda_{max}$ 407 nm,<br>$\varepsilon_{max}$ 38,000<br>HBW 68 nm (hexane)<br>Mp: Oil at room temp | 9.95 |
| Dye 8 | 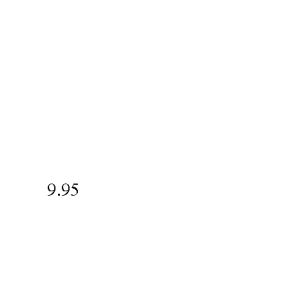 | UV-vis<br>$\lambda_{max}$ 470 nm,<br>$\varepsilon_{max}$ 36,000<br>HBW 93 nm (hexane)<br>Mp: 44-46° C. | 10.50 |

Preferably, Dyes 2, 4-6, and 8 can be used. In another preferred variant of the invention mixtures of dyes may be used, for example mixtures of Dye 6.

The following schemes show by way of example the synthesis of dyes of the invention, especially for dyes of Formulas I to VI which can be carried out by processes and under conditions known to the person skilled in the art; further details are given in the examples:

Scheme 1: Dyes of Formula I:
The preparation of dyes of Formula I by a 2 step procedure under convenient conditions as known in the art is exemplified in the following scheme for 4-((E)-(4-((E)-(2,4-Dinitrophenyl)diazenyl)-2,5-bis(2-ethylhexyloxy)phenyl)diazenyl)-3-methyl-N,N-octyl/ethylhexyl-aniline:

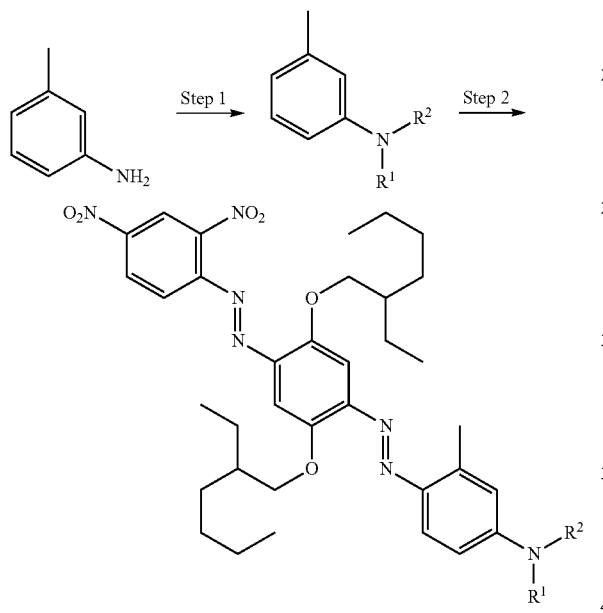

R1/R2 = n-octyl/ethylhexyl

Scheme 2: Dyes of Formula II:
The preparation of dyes of Formula II by a 2 step procedure under convenient conditions as known in the art is exemplified in the following scheme:

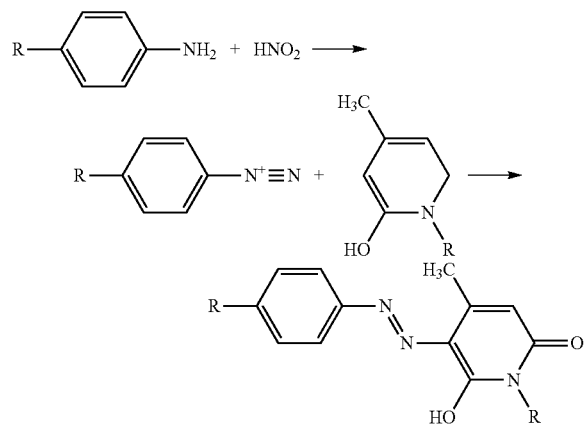

Scheme 3: Dyes of Formula III:
The preparation of dyes of Formula III by a 2 step procedure under convenient conditions as known in the art is exemplified in the following scheme for (E)-3-Methyl-4-((4-nitrophenyl)diazenyl)-N,N-dioctylaniline:

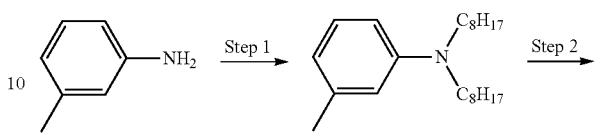

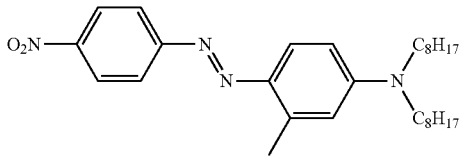

Scheme 4: Dyes of Formula IV:
The preparation of dyes of Formula IV by a 2 step procedure under convenient conditions as known in the art is exemplified in the following scheme

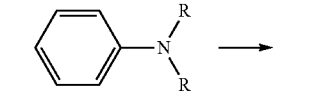

Scheme 5: Dyes of Formula V:
The preparation of dyes of Formula V under convenient conditions as known in the art is exemplified in the following scheme for 1,4-Bis(2-ethylhexyl/n-octyl/n-undecyl/n-dodecyl-amino)anthracene-9,10-dione:

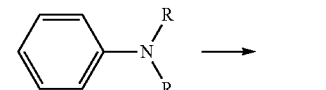

R = Ethylhexyl, n-octyl, n-undecyl, n-dodecyl

Scheme 6: Dyes of Formula 6:
The preparation of dyes of Formula 6 by a 2 step procedure under convenient conditions as known in the art is exemplified in the following scheme for N-(2-((4-Cyano-3-methylisothiazol-5-yl)diazenyl)-5-(dioctylamino)phenyl)acetamide:

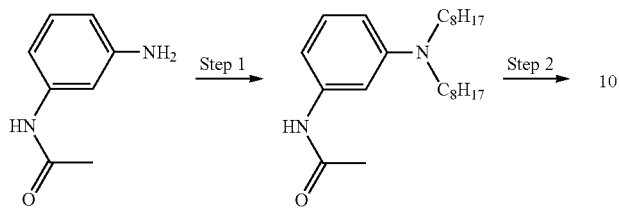

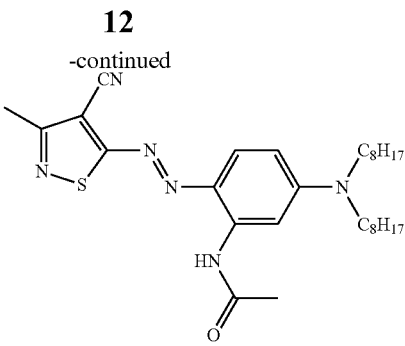

The preparation of further dyes can be carried out analogously to the illustrative reactions shown above and in the examples.

Particularly preferred dyes and dye mixtures are listed in Table 4:

TABLE 4

| Dye ref | Colour | Structure |
|---|---|---|
| Dye 8 | Red | (structure shown) |
| Dye6/ Dye2 | Green | (structure shown, C14) |
| | | R = n-octyl/2-ethylhexyl/undecyl/dodecyl |
| Dye 2 | Blue | (structure shown) |
| | | R = n-octyl/2-ethylhexyl/undecyl/dodecyl |

TABLE 4-continued

| Dye ref | Colour | Structure |
|---|---|---|
| Dye 4 | Magenta | (structure with isothiazole, azo, NHAc, CN, and dialkylamino groups) |
| Dye6/ Dye5 | Yellow | (two structures with C14 alkyl chains, azo linkages, and pyridinone rings with CN, HO, and 2-ethylhexyl substituents) |

Electrophoretic fluids of the invention comprise white and black particles which are oppositely charged or chargeable. Any such white and black particles commonly used in electrophoretic fluids may be used in the new electrophoretic fluids. The white particles can be selected from titanium dioxide in the rutil, anatase, or amorphous modification, surface coated titanium dioxide, titanium dioxide based particles, and white polymer particles. The black particles can be selected from carbon black, surface coated carbon black, carbon black based particles, and black polymer particles Usually electrophoretic fluids comprise white inorganic nanoparticles such as titania, alumina or barium sulphate, usually coated with a surface layer to promote good dispersibility in dielectric media and a dielectric fluid media.

Furthermore, the electrophoretic fluids of the present invention may comprise white reflective particles prepared by a process comprising the steps of a) forming a reverse emulsion comprising at least one polymer, at least one white reflective, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle. Such white reflective particles are described in WO 2011/154104.

Usually electrophoretic fluids comprise black inorganic particles such as Carbon Black, copper chromite, etc. usually coated with a surface layer to promote good dispersibility in dielectric media and a dielectric fluid media.

Also, black particles may be used which are prepared by a process comprising the steps of a) forming a reverse emulsion comprising at least one polymer, at least one white reflective or coloured particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle. These black particles are described in WO 2013/026519.

Furthermore, the electrophoretic fluids of the present invention may comprise black polymer particles or any other absorbing polymer particles comprising a polymerised or co-polymerised dye. Especially black and/or coloured copolymers particles comprising monomer units of at least one monomer, of at least one polymerisable dye, optionally of at least one charged co-monomer, and optionally of at least one crosslinking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles.

Such black polymer particles are described in the earlier application PCT/EP2012/004585 and comprise monomer units of at least one polymerisable dye according to Formula 1

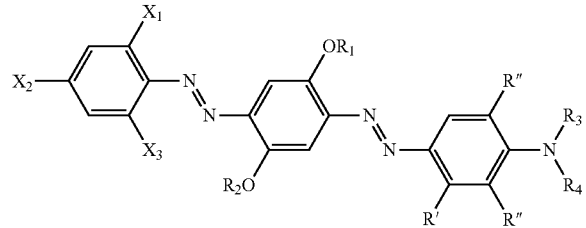

Formula (1)

wherein $X_1$, $X_2$, and $X_3$ are independently of one another H or an electron-withdrawing group;

$R_1$ and $R_2$ are independently of one another groups of the structure $L_1$-$Y_1$, $L_2$-$Y_2$ or linear, branched or cyclic alkyl groups;

$R_3$ and $R_4$ are independently of one another groups of the structure $L_3$-$Y_3$, $L_4$-$Y_4$ or linear, branched or cyclic, substituted or unsubstituted alkyl groups where one or more non-adjacent carbon atoms may be replaced by O, S and/or N;

$L_1$, $L_2$, $L_3$, and $L_4$ are independently of one another linear or branched, substituted or unsubstituted alkylene groups where one or more non-adjacent carbon atoms may be replaced by O, S and/or N;

$Y_1$, $Y_2$, $Y_3$, and $Y_4$ are independently of one another polymerisable groups;

R' is a linear or branched alkyl group, $OR_5$, H, $NHCOR_6$ or $NHSO_2R_7$;

R" is $OR_5$, H or $NHCOR_6$, $R_5$, $R_6$, and $R_7$ are independently of one another linear or branched alkyl groups; and Wherein at least one of $R_1$, $R_2$, $R_3$ and $R_4$ is a polymerisable group and at least one of $X_1$, $X_2$, and $X_3$ is an electron-withdrawing group. The term "electron-withdrawing group" is well known in the art and refers to the tendency of a substituent to attract valence electrons from neighbouring atoms; in other words the substituent is electronegative with respect to neighbouring atoms. Coloured particle described in WO 2009/100803, WO 2010/089057, WO 2010/089058, WO 2010/089059, WO 2010/089060, WO 2011/154103 and/or WO 2012/019704 may also be used in electrophoretic fluids of the invention, preferably those described in WO 2010/089057 and/or WO 2012/019704.

In a variant of the invention, the electrophoretic fluids comprise the preferred dyes described, titania, and carbon black, wherein titania, and carbon black are preferably surface coated.

In a preferred variant of the invention, the electrophoretic fluids comprise the preferred dyes described, white reflective polymer particles prepared by a RESR process described above, and black polymer particles prepared by a RESR process described above.

Especially preferred electrophoretic fluids comprise dyes of Formulas I to VI, particularly those listed in Tables 1 to 4, white reflective polymer particles prepared by a RESR process described above, and black polymer particles described above comprising a polymerised or co-polymerised dye.

Particle spacing can be controlled electrically. The particle spacing can be varied to change either the whiteness, or colourfulness as desired. For some applications, it may be desirable to have a white 'extreme' state—whereby the display looks white when the white particles are compressed on the top electrode. In this case particle spacing must be minimised, and the coloured state would then have to be achieved electrically using drive schemes. This would consist of a short pulse of DC voltage to move the particles across the distance of the cell. The exact details of drive scheme will vary dependent on the particle speed and required colour saturation. For a formulation with a response time of 100 ms, it could be envisaged that by applying a voltage for 40-45 ms, the particles could be moved to a point of maximum colour saturation. The level of colour saturation could be controlled by applying voltage pulses of different duration.

Electrophoretic fluids of the invention are primarily designed for use in electrophoretic displays, especially in mono, bi or polychromal electrophoretic devices. A typical electrophoretic display preferably consists of the particles dispersed in a low polar or non-polar solvent along with additives to improve electrophoretic properties, such as stability and charge. Examples of such dispersions are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

Typical additives to improve the stability of the fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich). Preferable surfactant additives in this work are Solsperse range and A-OT, and even more preferably Solsperse 17,000, 13650, 11000 and Solplus K500, A-OT and Span 85. Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (e.g. PEO/PEG/PPG), polyols (e.g. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants.

Any other additives to improve the electrophoretic properties can be incorporated provided they are soluble in the formulation medium, in particular thickening agents or polymer additives designed to minimise settling effects.

The dispersion solvent for the electrophoretic fluids of the invention is preferably a good solvent for the dyes and surfactants being used and can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trot (Shell), naphtha, and other petroleum solvents, as well as long chain alkanes such as dodecane, tetradecane, decane and nonane). These tend to be low dielectric, low viscosity, and low density solvents. A density matched particle I solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich).

Preferably, the electrophoretic fluids of the invention comprise at least one solvent selected from long chain alkanes, at least two kinds of particles having different colour and opposite electrical charge, and at least one highly absorbing dye, wherein the dye preferably has an absorbance of at least 0.5 a.u. in a cell thickness of 50 microns.

Particularly, combinations of the preferred dyes, preferred white particles, preferred black particles, and preferred solvents are used for electrophoretic fluids of the invention.

Even more preferred electrophoretic fluids of the invention comprise dodecane, tetradecane, decane, nonane or mixtures thereof, the preferred dyes described, white reflective polymer particles prepared by a RESR process described above, and black polymer particles prepared by a RESR process described above or black polymer particles described above comprising a polymerised or co-polymerised dye.

Especially preferred electrophoretic fluids comprise dyes of Formulas I to VI, particularly those listed in Tables 1 to 4, white reflective polymer particles prepared by a RESR process described above, and black polymer particles described above comprising a polymerised or co-polymerised dye.

Usually, all variants of the invention comprise at least one additive, preferably at least one surfactant, especially the preferred surfactants described above. Particularly, electrophoretic fluids of the invention may consist of solvents, dyes, white particles, black particles, and surfactants as described in the foregoing, preferably of all these components described as being preferred, especially of all these components described as being specially preferred.

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046 The Electrophoretic fluid is then incorporated into an Electrophoretic display element by a variety of pixel architectures, such as can be found in C. M. Lampert, Displays; 2004, 25(5) published by Elsevier B.V., Amsterdam.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

Advantages of the invention can be:
1. Significantly increased colour reflectivity can be achieved with higher colour saturation when compared to the use of reflective colour pigments or colour/titania hybrids.
2. By using dyes instead of pigments, there is a greater choice of colour and colour tuning opportunities.
3. It is easier to print the dyed fluid into compartmented displays than to print colour pigments.

The disclosures in the cited references are expressly also part of the disclosure content of the present patent application. In the claims and the description, the words "comprise/comprises/comprising" and "contain/contains/containing" mean that the listed components are included but that other components are not excluded. The following examples explain the present invention in greater detail without restricting the scope of protection. In the foregoing and in the following examples, unless otherwise indicated all parts and percentages are by weight (wt).

BRIEF DESCRIPTION OF THE DRAWINGS

FIG. 1 shows colour data for Examples 9-13.
FIG. 2 shows Y value comparison for Examples 9-13.

EXAMPLES

All chemicals are purchased from Sigma-Aldrich. All chemicals are purchased at the highest grade possible and are used without further purification unless otherwise stated.

The following abbreviations are used:
IMS industrial methylated spirit;
NMP N-Methylpyrrolidone
THF Tetrahydrofuran
DCM Dichloromethane
Mp melting point The characterisation of the formulations is performed using an Xrite Color i5 spectrophotometer to measure the colour coordinates of the extreme states. The absorbance of the dyes is measured using a Hitachi U3310 UV-vis spectrophotometer. All dye samples are measured at the concentration used in the examples, with no particles present, in glass cells with a 50 micron spacing.

Example 1

Dye 8: (E)-3-Methyl-4-((4-nitrophenyl)diazenyl)-N,N-dioctylaniline

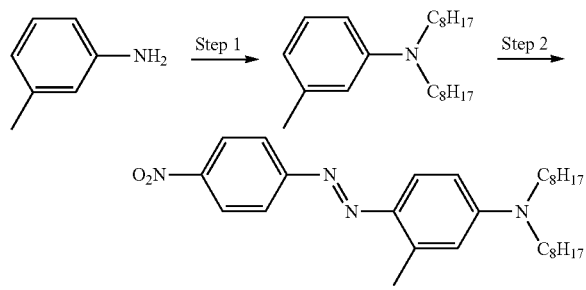

Step 1: Step 1a: 3-Methyl-N,N-dioctylaniline m-Toluidine (26.75 g, 0.25 mol), water (30 ml), 1-bromooctane (144.9 g, 0.75 mol), and MgO (100.8 g, 2.5 mol) are charged and the resultant suspension heated to 110° C. (bath temp) for 48 h. The reaction mixture is allowed to cool and hexane (100 ml) is added, causing precipitation of further solid. The solids are filtered-off to give an off-white filter cake and a yellow/brown filtrate. The filter cake is suspended in methylene chloride (100 ml), washed with dilute NaOH (3×100 ml), and dried over $MgSO_4$. The solution is filtered then passed through a small pad of silica gel to give a pale yellow filtrate. Evaporation of solvent gives the product as a pale yellow free flowing oil (34.5 g, 42%). $^1$H NMR shows expected signals.

Step 2: (E)-3-methyl-4((4-nitrophenyl)diazenyl)-N,N-dioctylaniline

4-Nitroaniline (4.14 g, 0.03 mol) is suspended in dilute HCl and to this is added a solution of sodium nitrite (2.2 g, 0.032 mol) at 0-5° C., pH<1. Excess nitrous acid is destroyed by adding sulfamic acid and the solution is added dropwise to a solution of 3-Methyl-N,N-dioctylaniline (10.6 g, 0.032 mol) in aqueous acetone. The resultant red tarry solid suspension is stirred overnight at ambient temperature and the solid filtered-off, washed with water then recrystallised from IMS. The resultant dark red crystalline solid is collected by filtration, washed with IMS and dried at 40° C. (11.5 g, 80%); mp=44-46° C.; $\lambda_{max}$ (hexane) 470 nm (36,000), FWHM 93 nm.

Example 2

Dye 6: (E)-1-(2-ethylhexyl)-6-hydroxy-4-methyl-5-((4-tetradecylphenyl)diazenyl)pyridin-2(1H)-one

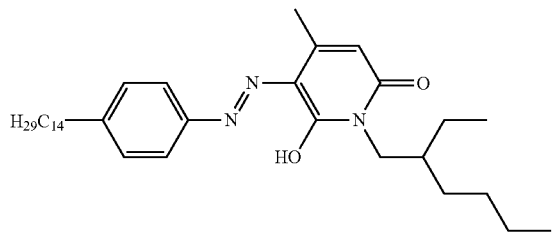

4-Tetradecylaniline (2.9 g, 10 mmol) is heated to melting in 2N HCl (15 ml) to give a white suspension. Water (30 ml) and ice (30 g) are added, followed by addition of 2N $NaNO_2$ (5.3 ml, 10.6 mmol) at 0-5° C. After 2 h at 0-5° C., the suspension is added to a solution of 1-(2-ethylhexyl)-6-hydroxy-4-methylpyridin-2(1H)-one (2.6 g, 11 mmol) in IMS (50 ml) and ice (50 g). After stirring overnight, the resultant solid is filtered-off and recrystallised twice from boiling 74 O.P. IMS to give the required compound as greenish-yellow crystals (4.5 g, 83%); mp: 63-65° C., $\lambda_{max}$ (hexane) 416 nm (38,000), FWHM 67 nm; $^1$H NMR (300 MHz, $CDCl_3$) δ0.89 (9H, m), 1.22-1.38 (30H, m), 1.61 (2H, m), 1.84 (1H, m), 2.29 (3H, d, J 0.5), 2.60-2.68 (2H, t, J 7.5), 3.86 (2H, m), 6.12 (1H, d, J 0.5), 7.20 (2H, d, J 7.0), 7.34 (2H, d, J 7.0), 14.55 (1H, s).

Example 3

Dye 2: 1,4-Bis(2-ethylhexyl/n-octyl/n-undecyl/n-dodecyl-amino)anthracene-9,10-dione

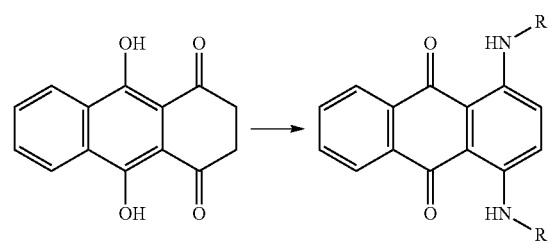

R = Ethylhexyl, n-octyl, n-undecyl, n-dodecyl

Water (550 ml) is degassed under vacuum for 30 minutes, then released to nitrogen. Under a nitrogen stream, potassium carbonate (2.75 g, 20 mmol) and sodium hydrosulfite (16.6 g, 95 mmol) are added and stirred until dissolved. 9,10-Dihydroxy-2,3-dihydroanthracene-1,4-dione (5.53 g, 22.8 mmol) is added and the reaction is heated to 80° C. Octylamine (7.4 g, 57 mmol), 2-ethylhexylamine (7.4 g, 57 mmol), undecylamine (8.0 g, 47 mmol) and dodecylamine (10.6 g, 57 mmol) are mixed and heated to form a clear solution, and this mixture is then added to the leucoquinizarin in a single portion. The reaction is stirred at 80° C. overnight then allowed to cool to room temp. The resultant oil is extracted into dichloromethane, dried ($Na_2SO_4$) and evaporated to a green-blue oil. The oil is dissolved in methanol (150 ml) and then aerated with compressed air via a sintered gas tube for 2 h. A large amount of solid separated, which is filtered off. The solid is purified over a silica pad (50 g silica), applied in 25/75 DCM/hexane and eluted with an increasing gradient of dichloromethane (25-40%) in hexane. The blue containing fractions are combined and evaporated to give a blue solid (3.0 g). The mother liquors from the aeration reaction are evaporated to an oil, which is steam distilled for 1 h to remove the bulk of the fatty amines. The oil is separated from water, then boiled in hot dilute mineral acid (ca 0.1M HCl). After cooling to ca 60° C., the oil is extracted into toluene, dried (MgSO$_4$) and evaporated to a thick blue oil. The solid is purified over a silica pad (50 g silica), applied in 25/75 DCM/hexane and eluted with an increasing gradient of dichloromethane (25-50%) in hexane. The blue containing fractions are combined and evaporated to give a blue solid (1.4 g). The two purified fractions are dissolved in dichloromethane, combined and evaporated to give a blue oil (3.4 g, 30%) which solidified on standing. $\lambda_{max}$ (hexane) 645 nm (15,250).

Example 4

Dye 4: N-(2-((4-Cyano-3-methylisothiazol-5-yl)diazenyl)-5-(dioctylamino)phenyl)acetamide

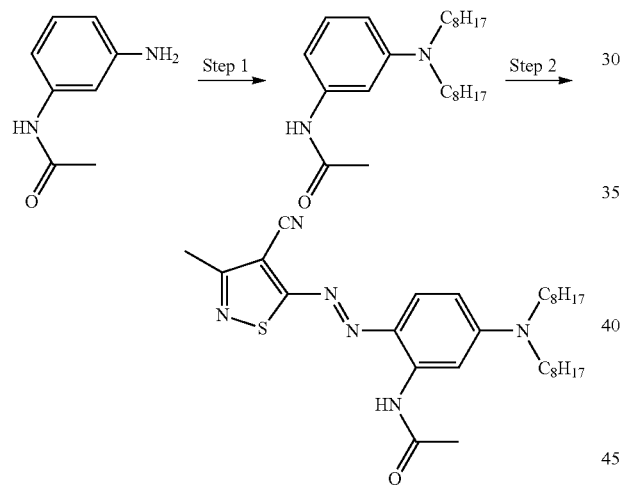

Step 1: N-(3-(Dioctylamino)phenyl)acetamide

N-(3-Aminophenyl)acetamide (39.5 g, 0.26 mol), 1-bromooctane (127.2 g, 0.66 mol), N-methyl-2-pyrrolidone (125 ml) and sodium bicarbonate (55.2 g, 0.66 mol) are charged and heated at 100° C. overnight. Acetic anhydride (5 ml) is added at 100° C., stirred 1 h then methanol (20 ml) added and stirred a further 1 h. The entire reaction mass is allowed to cool then filtered. The solids are washed with methanol and all washings combined with the product solution. Solution of coupler is used directly with no further purification. HPLC showed 99% purity of the final material.

Step 2: N-(2-((4-Cyano-3-methylisothiazol-5-yl)diazenyl)-5-(dioctylamino)phenyl)acetamide 5-Amino-3-methyl-4-isothiazolecarbonitrile (8.4 g, 0.06 mol) is suspended in a mixture of propionic acid (25 ml) and acetic acid (50 ml) and cooled externally in an ice/salt bath to 3° C. (internal temp.). 40% (w/w) Nitrosyl sulfuric acid in sulfuric acid (21.0 g, 0.066 mol) is then added dropwise over 1 h at 3-5° C. then stirred for a further 30 minutes at 3-5° C. minutes at which point all solid had dissolved to give a dark brown diazonium salt solution. N-(3-(Dioctylamino)phenyl)acetamide (0.06 mol) is diluted with methanol (200 ml) and 10% sulfamic acid solution (25 ml) added, followed by crushed ice (500 g). The diazonium salt solution is then added dropwise over ca 10 minutes to produce a precipitated purple solid. After a further 60 minutes of stirring, the solid is filtered-off and the filter cake is washed with water (1 L) until the filtrate ran colourless. The filter cake is dissolved in CH$_2$Cl$_2$ (1 L) and dried over MgSO$_4$. Methanol (600 ml) is then added and the dilute solution stirred overnight, allowing to evaporate slowly. The precipitated mass filtered-off, washed further with methanol (300 ml) then purified further over silica gel, eluting with CH$_2$Cl$_2$, then 2% acetone in CH$_2$Cl$_2$. The purest fractions are combined and evaporated, the solid is triturated in methanol (300 ml) and filtered-off, then dried to give the required product as a red solid (16.3 g, 52%) with >99% purity by HPLC; mp: 110-111° C., $\lambda_{max}$ (hexane) 536 nm (61,750), FWHM 71 nm; $^1$H NMR showed two different conformers: (300 MHz, CDCl$_3$) δ0.9 (6H, m), 1.3 (20H, m), 1.7 (4H, m), 2.3 and 2.4 (3H, 2xs), 2.6 (3H, s), 3.5 (4H, q), 6.5 (1H, m), 7.5 and 7.9 (1H, 2xd), 8.1 and 8.3 (1H, 2xs), 9.0 and 12.5 (1H, 2xs).

Example 5

Dye 5: (E)-1-(2-Ethylhexyl)-6-hydroxy-4-methyl-2-oxo-5-((4-tetradecylphenyl)diazenyl)-1,2-dihydropyridine-3-carbonitrile

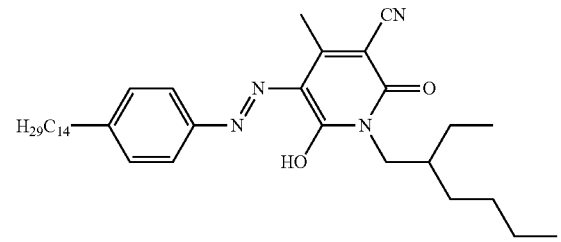

4-Tetradecylaniline (5.8 g, 20 mmol) is heated to melting in 2N HCl (25 ml) to give a white suspension. Water (50 ml) and ice (50 g) are added, followed by addition of 2N NaNO$_2$ (10.5 ml, 21 mmol) at 0-5° C. After 2 h at 0-5° C., the suspension is added to a solution of 1-(2-ethylhexyl)-6-hydroxy-4-methyl-2-oxo-1,2-dihydropyridine-3-carbonitrile (5.2 g, 20 mmol) in IMS (100 ml) and ice (100 g). After stirring overnight, the resultant solid is filtered-off and recrystallised twice from boiling 74 O.P. IMS to give the required compound as orange crystals (10.3 g, 92%); with >99% purity by HPLC; mp: 73-75° C., $\lambda_{max}$ (hexane) 436 nm (45,000), FWHM 73 nm; $^1$H NMR (300 MHz, CDCl$_3$) δ0.89 (9H, m), 1.20-1.35 (30H, m), 1.62 (2H, m), 1.82 (1H, m), 2.60-2.68 (5H, m), 3.89 (2H, m), 7.25 (2H, m), 7.41 (2H, m), 15.10 (1H, s).

Example 6

Preparation of a Black Polymerisable Dye

Prepared by a 7 step procedure according to Example 3 of the earlier filed patent application PCT/EP2012/004585 as detailed below:

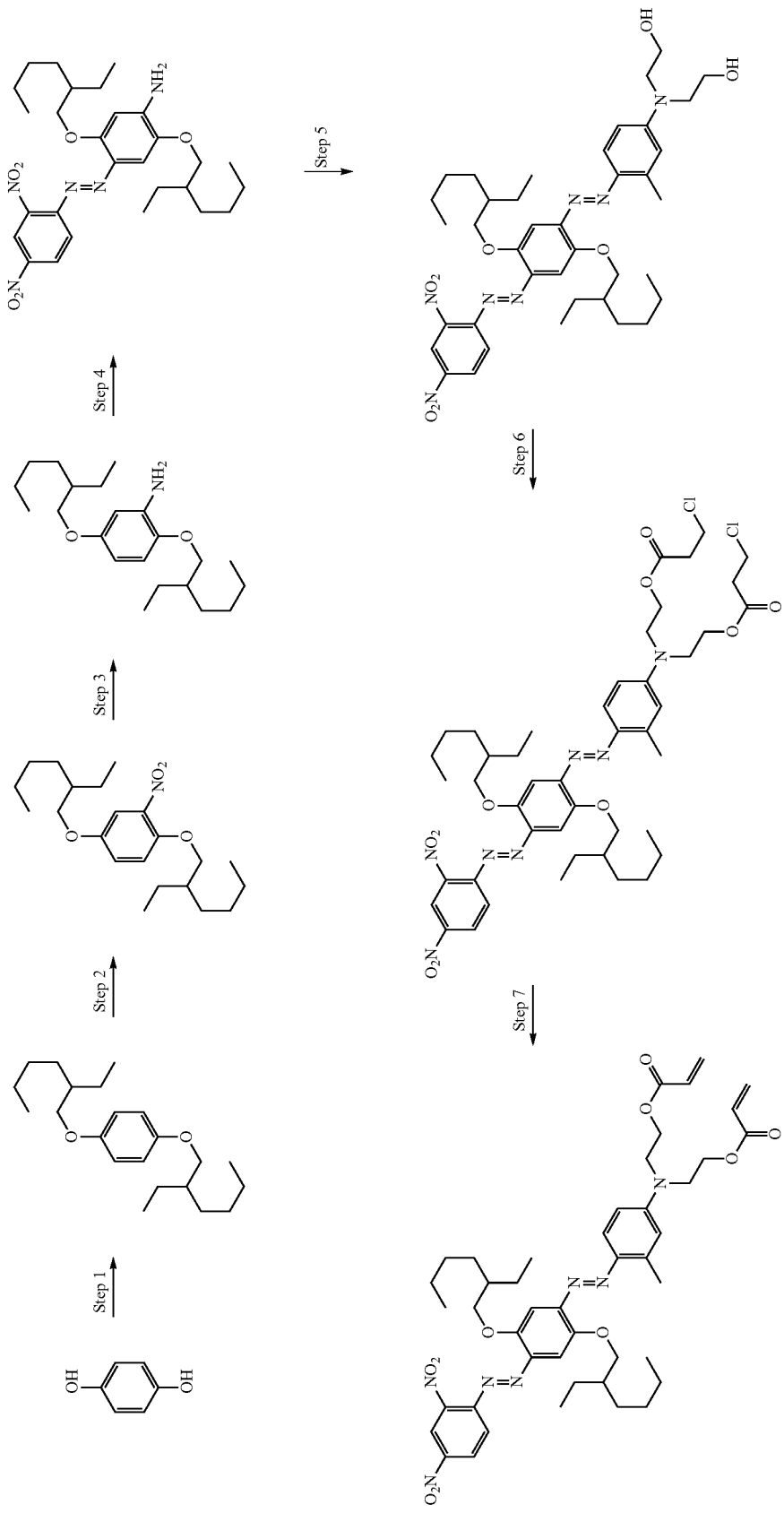

Step 1: 1,4-Bis(2-ethylhexyloxy)benzene

Hydroquinone (37.9 g, 0.344 mol) is suspended in IMS (310 ml) and 1-bromo-2-ethylhexane (132.7 g, 0.687 mol) is added. A solution of KOH (49.9 g, 0.89 mol) in IMS (250 ml) is added slowly over 1 minute. The mixture is heated at reflux whilst monitoring reaction progress by HPLC. After 16 hours, further 1-bromo-2-ethylhexane (53.1 g, 0.27 mol) and solid KOH (20.0 g, 0.36 mol) are added then heated for 2 hours at reflux. The reaction mixture is allowed to cool, is poured into water (1.5 L) and extracted with toluene (500 ml). The organic layer is dried over $MgSO_4$ then evaporated to yield a pale yellow oil. The oil is flashed through silica gel, eluting with 50/50 dichloromethane/hexane to give two product fractions. The initial fraction (35.3 g) co-eluted with 2-ethylhexan-1-ol by-product. The second fraction is evaporated to give pure 1,4-bis(2-ethylhexyloxy)benzene as a pale yellow oil (48.4 g, 42%). The initial fraction is further purified by bulb to bulb distillation to give further pure 1,4-bis(2-ethylhexyloxy)benzene as a pale yellow oil (25.3 g, 22%).

Step 2: 1,4-Bis(2-ethylhexyloxy)-2-nitrobenzene 1,4-Bis(2-ethylhexyloxy)benzene (50.2 g, 0.150 mol) is dissolved in chloroform (150 ml) and cooled to 0° C. Nitric acid (70%, 17.0 g, 0.190 mol) is added dropwise at 0-3° C. and the reaction stirred whilst monitoring progress by HPLC. After 60 minutes, water (50 ml) is added and the organic layer separated, dried ($MgSO_4$) and evaporated to give the title compound as a yellow oil (56.9 g, 100%). The material is used without further purification.

Step 3: 2,5-Bis(2-ethylhexyloxy)aniline 1,4-Bis(2-ethylhexyloxy)-2-nitrobenzene (11.4 g, 0.03 mol) is dissolved in 2-propanol (100 ml) and degassed under vacuum, purging to nitrogen. 10% (w/w) Pd/C (0.52 g) is added and the mixture heated to 80° C. Water (10 ml) is added, followed by solid ammonium formate (18.9 g, 0.3 mol). After a further 1 hour at 80° C., the reaction mixture is allowed to cool then filtered to remove catalyst, to give a colourless solution which darkened rapidly on standing. The material is used immediately as an isopropanol solution (quant.).

Step 4: 4-((2,4-Dinitrophenyl)diazenyl)-2,5-bis(2-ethylhexyloxy)aniline 2,4-Dinitroaniline (3.7 g, 0.02 mol) is suspended in a mixture of acetic acid (20 ml) and propionic acid (10 ml) and cooled to 3° C. 40% (w/w) nitrosyl sulfuric acid in sulfuric acid (6.4 g, 0.02 mol) is added dropwise and stirring continued for 30 minutes to give a pale yellow solution. Crude 2,5-bis(2-ethylhexyloxy)aniline (0.02 mol) solution is diluted with IMS (200 ml) and 10% sulfamic acid solution (20 ml) added, followed by ice (200 g). The above pale yellow diazonium salt solution is slowly added with stirring and a dark oil rapidly separated. The mixture is stirred overnight and the water is decanted off. The crude product (8.3 g) is dissolved in 25/75 dichloromethane/hexane and purified over silica gel, the required product eluting with 50/50 hexane/dichloromethane. Evaporation and trituration with methanol gave 4-((2,4-dinitrophenyl)diazenyl)-2,5-bis(2-ethylhexyloxy)aniline as a violet-blue crystalline solid (4.2 g, 39%).

Step 5: 2,2'-(4-((E)-(4-((E)-(2,4-Dinitrophenyl)diazenyl)-2,5-bis(2-ethylhexyloxy)phenyl)diazenyl)-3-methylphenylazanediyl)diethanol 4-((2,4-Dinitrophenyl)diazenyl)-2,5-bis(2-ethylhexyloxy)aniline (0.54 g, 1 mmol) is dissolved in NMP (10 ml) and to this is added 40% (w/w) nitrosyl sulfuric acid in sulfuric acid (0.38 g, 1.2 mmol). After 30 minutes, the mixture is added to a solution of 2,2'-(m-tolylazanediyl)diethanol (0.20 g, 1 mmol) and sulfamic acid (0.5 g) in IMS (100 ml). A dark oily solid separates immediately. After stirring overnight, the aqueous supernatant is decanted off, the oily solid washed with further water, then dried at 40° C. The pure title compound is acquired as a blue-black solid after multiple purifications over silica gel, eluting with dichloromethane containing an increasing concentration of ethyl acetate (0.54 g, 72%).

Step 6: 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)bis(3-chloropropanoate)

2,2'-(4-((E)-(4-((E)-(2,4-Dinitrophenyl)diazenyl)-2,5-bis(2-ethylhexyloxy)phenyl)diazenyl)-3-methylphenylazanediyl)diethanol (3.5 g, 5 mmol) is dissolved in dichloromethane (50 ml) and sodium bicarbonate (12.6 g, 0.15 mol) is added with stirring to suspend. 3-Chloropropionyl chloride (1.9 g, 15 mmol) is added and the mixture heated at 40° C. (bath temp.) overnight. The inorganics are filtered off, the dichloromethane is evaporated and the product solidified by adding IMS. A 2.7 g sample of crude product is taken through directly to the next step without further purification. A 1 g sample of material is recrystallised from IMS to obtain a pure sample as a violet/black crystalline solid; m.p 123-125° C., $\lambda_{max}$ (EtOAc) 573 nm (40,000), half bandwidth 160 nm, 353 nm (13,500).

Step 7: 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)diacrylate Crude 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)bis(3-chloropropanoate) (2.7 g, 2.9 mmol) is dissolved in dichloromethane (50 ml) and triethylamine (0.9 g, 8.7 mmol) is added. The mixture is heated at 30° C. (bath temp.) overnight and the product precipitated by adding IMS. The solid is recrystallised from hot IMS and the title compound is isolated as a violet/black powder; m.p 128-130° C., $\lambda_{max}$ (EtOAc) 574 nm (40,000), half bandwidth 160 nm, 354 nm (13,500).

Example 7

Preparation of Black Polymer Particles

Black polymer particles are prepared analogously to Example 6 of the earlier filed patent application PCT/EP2012/004585:

NAD stabiliser 30% by weight in dodecane is obtained from ICI Ltd. precipitated in cold methanol, dried and dissolved in a 50:50 mixture of ethyl acetate (Aldrich) and butyl acetate (Aldrich). All materials other than dyes are commercially available.

Methyl methacrylate (20.58 g), NAD stabiliser (3.50 g) and methacrylic acid (0.42 ml) are weighed out into a 100 ml 3-necked flask equipped with a condenser, nitrogen flow, and an overhead stirrer. 1.029 g (5 weight %) of the black polymerisable dye of Example 6 is added and stirred for 1 minute to facilitate dissolution of the dye. Dodecane (25.20 g) is added to the reaction flask, followed by 1-octanethiol (0.125 ml). The mixture is heated with stirring at 300 rpm, once the temperature in the flask is at 75° C., Vazo 67 (0.20 g) is added and the reaction is stirred for 2 hours.

The resulting solution is filtered through 50 micron cloth to remove small lumps. The particles are cleaned using a centrifuge. Centrifugations are carried out at 10 000 rpm for 40 minutes each, replacing the supernatant with dodecane. This is repeated until the supernatant is colourless. Average particle size is measured by SEM and image analysis: 547 nm.

Example 8

Black and White Particle Concentrate 0.15 g of AOT and 0.35 g of Span 85 are added to 1.5 g of a 50% w/w dispersion of the black particles according to Example 7 in dodecane and 5.0 g of a 30% w/w dispersion of white particles in dodecane, as exemplified in Example 2 of WO 2011/154104 in dodecane to give approximately 7 g of black/white particle dispersion concentrate.

Example 9

RED Formulation of the Invention 0.5 g of a saturated solution of Dye 8 is added to 1.0 g of the dispersion from example 6 and vortex mixed. The formulation is roller mixed for 24 hours and then the colour of the saturated colour state is measured using an xrite Color i5 spectrophotometer in reflection mode, specular excluded, d65 illumination. The results are shown in Table 6. When compared to a typical red pigment dispersion as shown in Table 5, it can be seen that the Y value, analogous to the reflectivity, is significantly increased. Absorbance data are shown in Table 7.

Example 10

GREEN Formulation of the Invention 0.5 g of a saturated solution of a mixture of Dye 6 and Dye 2 (weight ratio 1:1) is added to 1.0 g of the dispersion from example 1 and vortex mixed. The formulation is roller mixed for 24 hours and then the colour of the saturated colour state is measured using an xrite Color i5 spectrophotometer in reflection mode, specular excluded, d65 illumination. The results are shown in Table 6. When compared to a typical green pigment dispersion as shown in Table 5, it can be seen that the Y value, analogous to the reflectivity, is significantly increased. Absorbance data are shown in Table 7.

Example 11

BLUE Formulation of the Invention 0.5 g of a saturated solution of Dye 2 is added to 1.0 g of the dispersion from example 1 and vortex mixed. The formulation is roller mixed for 24 hours and then the colour of the saturated colour state is measured using an xrite Color i5 spectrophotometer in reflection mode, specular excluded, d65 illumination. The results are shown in Table 6. When compared to a typical blue pigment dispersion as shown in Table 51, it can be seen that the Y value, analogous to the reflectivity, is significantly increased. Absorbance data are shown in Table 7.

Example 12

MAGENTA Formulation of the Invention 0.5 g of a saturated solution of Dye 4 is added to 1.0 g of the dispersion from example 1 and vortex mixed. The formulation is roller mixed for 24 hours and then the colour of the saturated colour state is measured using an xrite Color i5 spectrophotometer in reflection mode, specular excluded, d65 illumination. The results are shown in Table 6. When compared to a typical magenta pigment dispersion as shown in Table 5, it can be seen that the Y value, analogous to the reflectivity, is significantly increased. Absorbance data are shown in Table 7.

Example 13

YELLOW Formulation of the Invention 0.5 g of a saturated solution of a mixture of Dye 6 and Dye 15 (weight ratio 1:1) is added to 1.0 g of the dispersion from example 1 and vortex mixed. The formulation is roller mixed for 24 hours and then the colour of the saturated colour state is measured using an xrite Color i5 spectrophotometer in reflection mode, specular excluded, d65 illumination. The results are shown in Table 6. When compared to a typical yellow pigment dispersion as shown in Table 5, it can be seen that the Y value, analogous to the reflectivity, is significantly increased. In addition, the xy coordinates show significantly improved colour saturation. Absorbance data are shown in Table 7.

Figures:
FIG. 1 shows colour data for Examples 9-13
FIG. 2 shows Y value comparison for Examples 9-13

TABLE 5

Colour data of 'typical' commercially available RGBCMY pigment dispersions

| Name | L* | a* | b* | X | Y | Z | x | y |
|---|---|---|---|---|---|---|---|---|
| Pigment RED | 23.32 | 27.69 | 27.98 | 5.813 | 3.893 | 0.842 | 0.5511 | 0.3691 |
| Pigment GREEN | 26.52 | −10.76 | 13.33 | 3.894 | 4.925 | 2.895 | 0.3325 | 0.4204 |
| Pigment BLUE | 13.53 | 3.59 | −24.22 | 1.7 | 1.65 | 5.69 | 0.1881 | 0.1825 |
| Pigment MAGENTA | 18.17 | 22.77 | −6.6 | 3.729 | 2.555 | 3.771 | 0.3708 | 0.2541 |
| Pigment YELLOW | 31.31 | 7.12 | 27.17 | 7.128 | 6.783 | 2.158 | 0.4436 | 0.4221 |

TABLE 6

Colour data for examples 9-13

| Name | L* | a* | b* | X | Y | Z | x | y |
|---|---|---|---|---|---|---|---|---|
| Red example 9 | 49.96 | 28.18 | 25.75 | 23.15 | 18.389 | 9.134 | 0.4569 | 0.3629 |
| Black example 9 | 9.3 | 24.19 | 8.61 | 1.794 | 1.037 | 0.511 | 0.5368 | 0.3103 |
| Green example 10 | 61.89 | −9.13 | 0.63 | 26.425 | 30.274 | 32.028 | 0.2978 | 0.3412 |
| Black example 10 | 10.9 | −15.86 | −4.5 | 0.758 | 1.247 | 1.767 | 0.2009 | 0.3306 |
| Blue example 11 | 54.84 | −9.74 | −16.54 | 19.596 | 22.779 | 35.775 | 0.2508 | 0.2915 |
| Black example 11 | 7.09 | 21.77 | −35.3 | 1.354 | 0.785 | 5.684 | 0.1731 | 0.1003 |
| Magenta example 12 | 54.85 | 21.45 | −5.57 | 26.484 | 22.788 | 27.951 | 0.343 | 0.2951 |
| Black example 12 | 2.2 | 11.09 | 2.49 | 0.501 | 0.244 | 0.09 | 0.6002 | 0.2919 |
| Yellow example 13 | 64.55 | −10.85 | 69.71 | 28.858 | 33.48 | 4.438 | 0.4322 | 0.5014 |
| Black example 13 | 16.76 | 0.82 | 24.56 | 2.172 | 2.252 | 0.298 | 0.46 | 0.4768 |

TABLE 7

Absorbance data for Dyes used in examples 9-13

| Example number | Dye | Absorbance as used in examples 9-13 |
|---|---|---|
| 9 | 8 | 1.435 |
| 10 | 6/2 mixture | 0.767 |
| 11 | 2 | 0.885 |
| 12 | 4 | 0.765 |
| 13 | 6/5 mixture | 2.278 |

The invention claimed is:

1. An electrophoretic fluid comprising at least one solvent, at least two kinds of particles having different colour and opposite electrical charge, and at least one highly absorbing dye, wherein the dye or a dye mixture has an absorbance of at least 0.3 a.u. in a cell thickness of 50 microns, and wherein the electrophoretic fluid comprise at least one dye according to Formula I, Formula II, Formula III, Formula IV Formula V or Formula VI

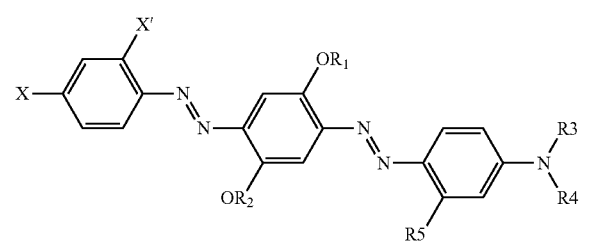

Formula I wherein

X and X' are independently of one another H or an electron-withdrawing group;

$R_1$ and $R_2$ are independently of one another groups are linear or branched, substituted or unsubstituted alkyl groups where one or more non-adjacent carbon atoms may be replaced by O, S and/or N;

$R_3$ and $R_4$ are independently of one another groups are linear or branched, substituted or unsubstituted alkyl groups where one or more non-adjacent carbon atoms may be replaced by O, S and/or N;

R5 is a methyl or methoxy group;

and the dye comprises at least one electron-withdrawing group;

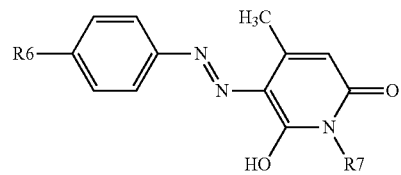

Formula II wherein $R_6$ and $R_7$ are independently of one another groups are linear or branched, substituted or unsubstituted alkyl groups where one or more non-adjacent carbon atoms may be replaced by O, S and/or N;

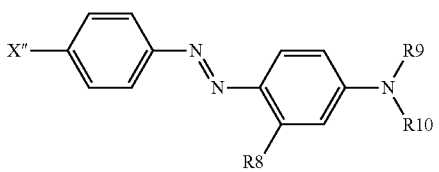

Formula III wherein

X" is an electron-withdrawing group;

$R_8$ is a methyl or methoxy group;

$R_9$ and $R_{10}$ are independently of one another groups are linear or branched, substituted or unsubstituted alkyl groups where one or more non-adjacent carbon atoms may be replaced by O, S and/or N;

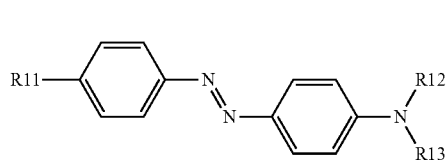

Formula IV wherein $R_{12}$ and $R_{13}$ are independently of one another groups are linear or branched, substituted or unsubstituted alkyl groups where one or more non-adjacent carbon atoms may be replaced by O, S and/or N;

$R_{11}$ is an alkyl or alkoxy group with at least 3 carbon atoms;

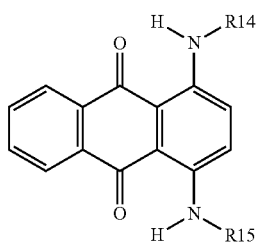

Formula V wherein
R$_{14}$ and R$_{15}$ are independently of one another groups are linear or branched, substituted or unsubstituted C8-C20 alkyl group where one or more non-adjacent carbon atoms may be replaced by O, S and/or N;

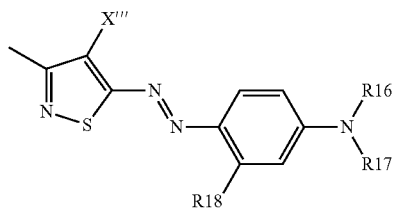

Formula VI wherein
X''' is an electron-withdrawing group;
R$_{16}$ and R$_{17}$ are independently of one another groups are linear or branched, substituted or unsubstituted alkyl groups where one or more non-adjacent carbon atoms may be replaced by O, S and/or N;
R$_{18}$ is NHCOR with R=linear or branched C1-C10 alkyl groups.

2. The electrophoretic fluid according to claim 1, wherein the electrophoretic fluid comprises at least two dyes wherein each dye comprises at least one chromophoric group and at least one solubilizing group and wherein at least two dyes comprise different solubilizing groups.

3. The electrophoretic fluid according to claim 1, wherein the dyes comprise different hydrocarbon groups selected from straight chain or branched hydrocarbon groups with at least 4 carbon atoms, optionally substituted with O, S, N or F atoms.

4. The electrophoretic fluid according to claim 1, wherein the electrophoretic fluid comprises at least two dyes with homologue solubilizing groups.

5. The electrophoretic fluid according to claim 1, wherein the electrophoretic fluid comprises at least two dyes with the same chromophoric is group.

6. The electrophoretic fluid according to claim 1 wherein the electrophoretic fluid comprises at least two dyes with different chromophoric is groups.

7. The electrophoretic fluid according to claim 1, wherein the electrophoretic fluid comprises at least one non-polar solvent having a dielectric constant <10, volume resistivity about $10^{15}$ ohm-cm, viscosity <5 cst, and a boiling point >80° C.

8. The electrophoretic fluid according to claim 1 wherein the electrophoretic fluid comprises black particles selected from carbon black, surface coated carbon black, carbon black based particles, and black polymer particles.

9. The electrophoretic fluid according to claim 1, wherein the electrophoretic fluid comprises white particles selected from titanium dioxide in the rutil, anatase, or amorphous modification, surface coated titanium dioxide, titanium dioxide based particles, and white polymer particles.

10. A method for the preparation of a mono, bi or polychromal electrophoretic device comprising utilizing the electrophoretic fluids according to claim 1.

11. An electrophoretic display device comprising an electrophoretic fluid according to claim 1.

12. The electrophoretic display device according to claim 11, wherein the electrophoretic fluid is applied by a technique selected from inkjet printing, slot die spraying, nozzle spraying, and flexographic printing, or any other contact or contactless printing or deposition technique.

* * * * *